United States Patent Office 2,726,137
Patented Dec. 6, 1955

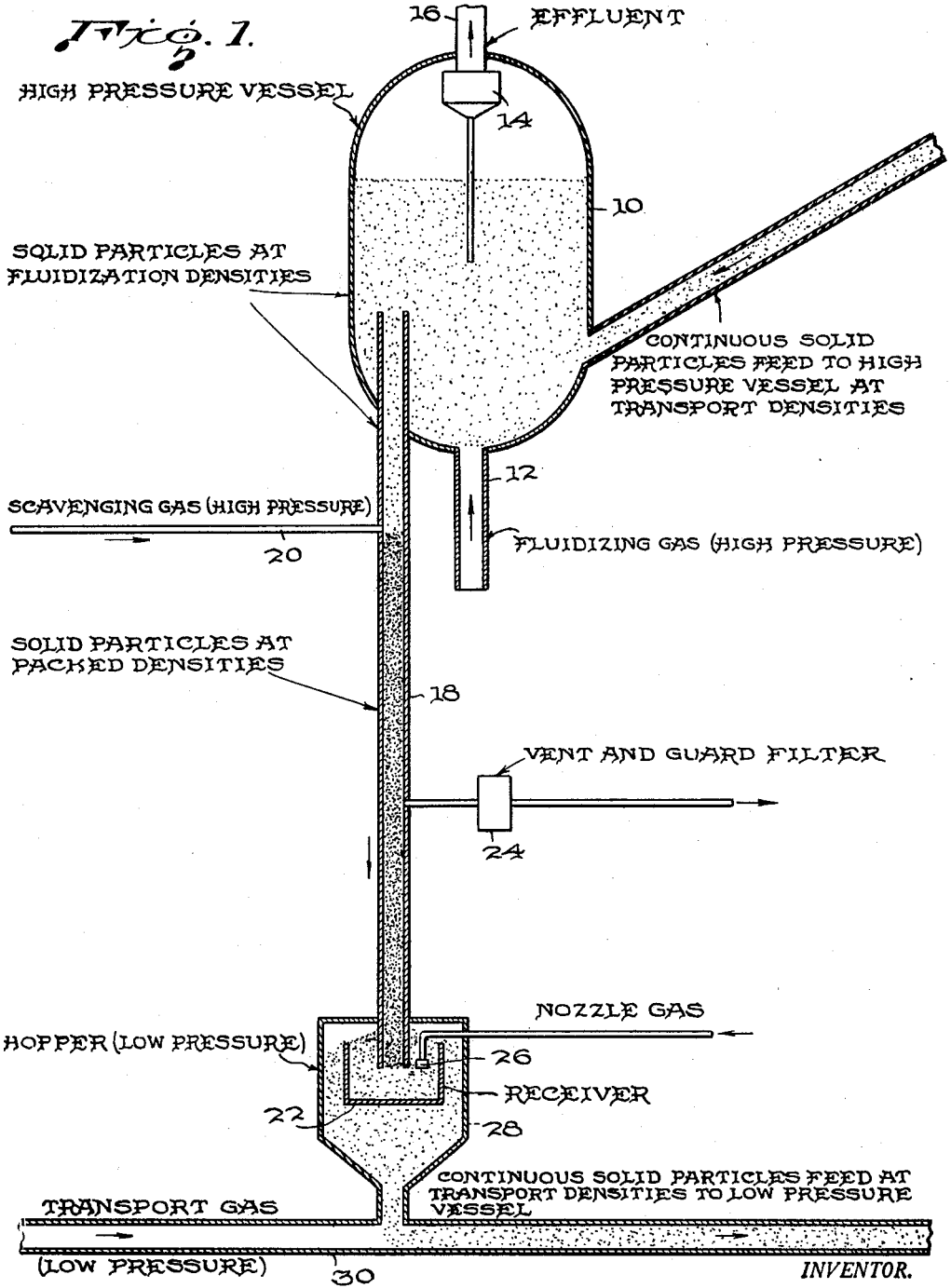

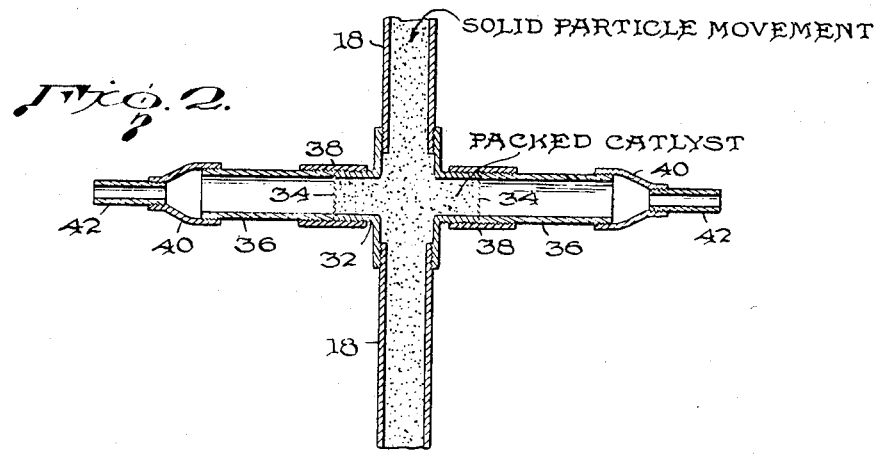
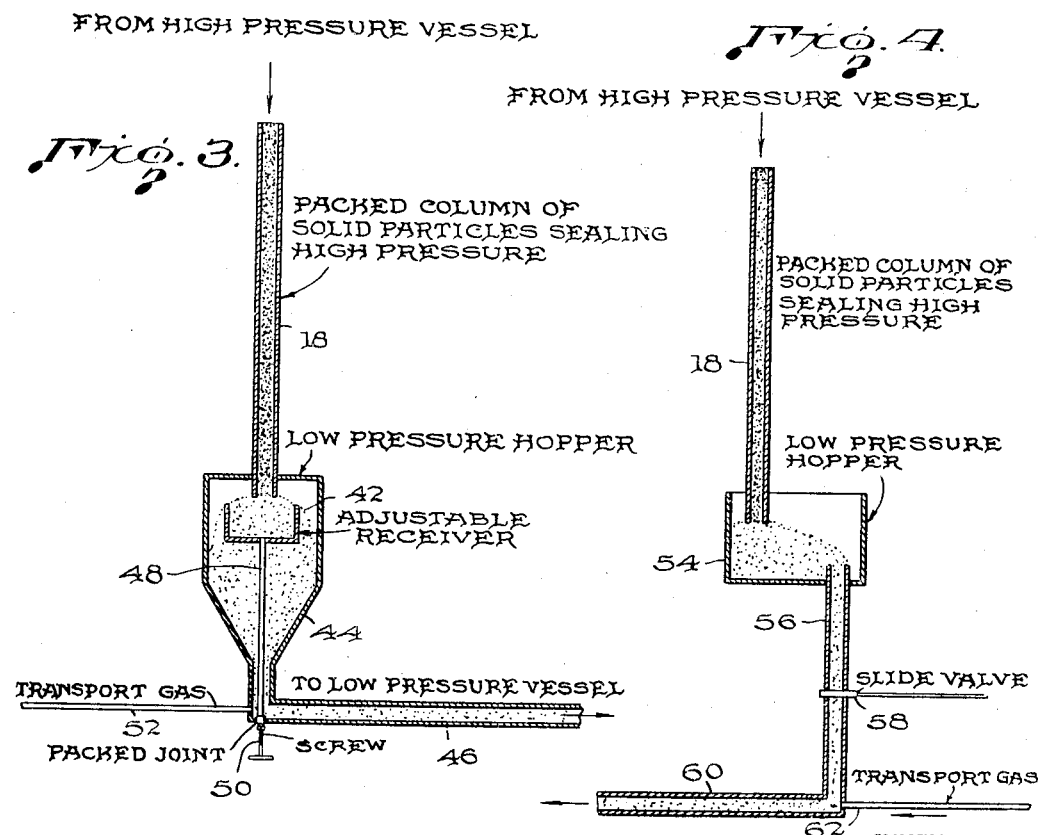

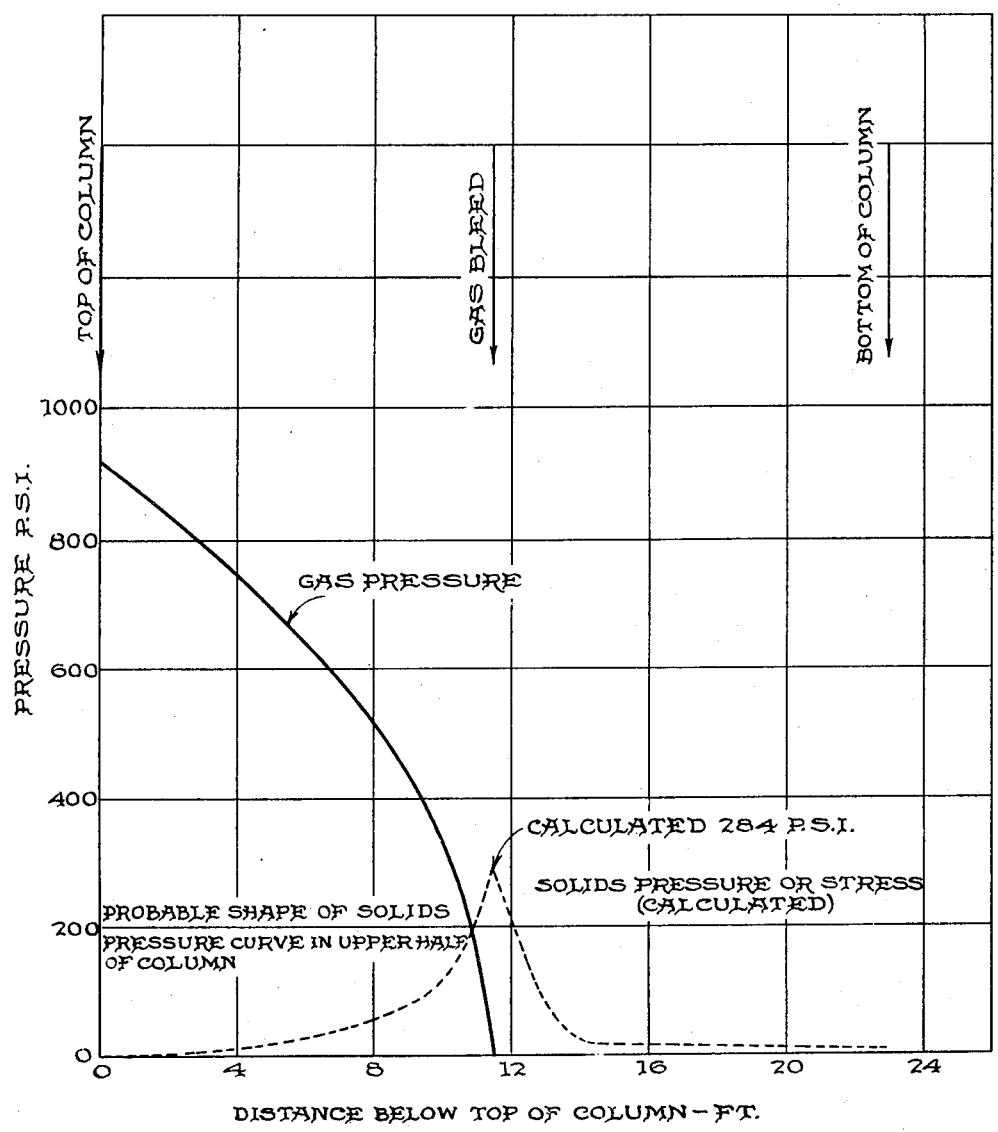

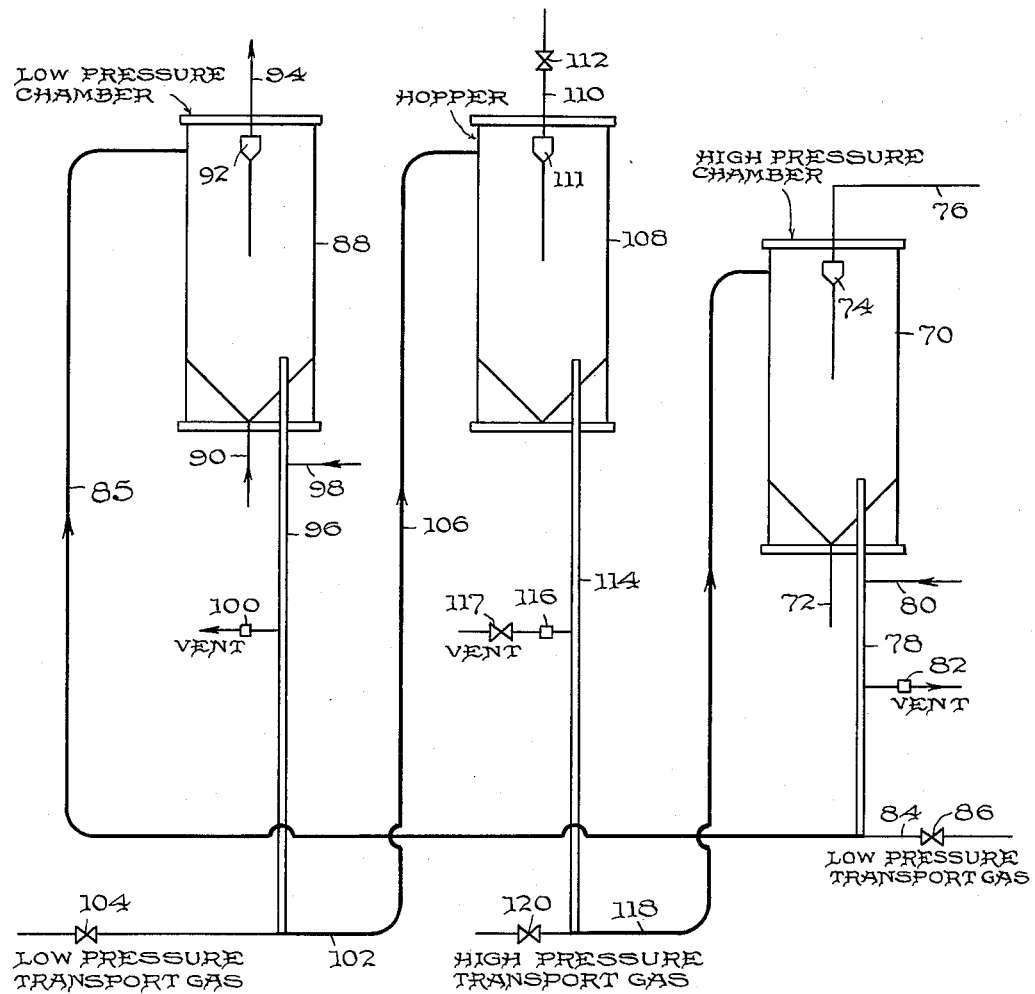

2,726,137

PROCESS AND APPARATUS FOR TRANSFER OF SOLID PARTICLES

Damon A. Davis, Jr., Port Arthur, Tex., assignor to Gulf Oil Corporation, Pittsburgh, Pa., a corporation of Pennsylvania Application July 13, 1951, Serial No. 236,539

11 Claims. (Cl. 23—1)

This invention relates to apparatus for introducing solid particles into a high pressure system without substantial simultaneous passage of gas or loss of pressure. The invention also includes a complete system for introduction of solid particles into and removal of solid particles from a high pressure system.

The control of flow of solid particles such as during the introduction into and removal of solid particles from a high pressure system is a problem which has been frequently encountered but has not been completely solved. Solid particles can be suspended in a liquid to form a slurry and then passed through valves or the like. However there is a limit to the amount of solids that can be suspended and still have a liquid, flowing mixture. Also wear of apparatus takes place and it is frequently undesirable to wet the solid particles with a liquid. Also solid particles can be suspended in a gas to resemble a fluid and passed through ordinary gate or compression valves. However, the moving parts of such valves are rapidly destroyed by the abrasive action of the solid particles. It has been proposed in U. S. Reissue Patent No. 23,237, May 30, 1950, to utilize a densely packed column of solid particles as a means for passing solid particles between systems at different pressures without flow of gas between the two systems. The only specific application mentioned was fluidized catalytic cracking. In this particular operation the pressure differential within the system in which the catalyst particles are circulated is relatively small. Tests indicate that this procedure is satisfactory for small pressure differentials only. For instance, a densely packed column of solid particles of one typical fluid cracking catalyst 3 feet high is blown out of the vertical conduit in which it is contained when the pressure differential is 10 pounds per square inch. Similarly a densely packed column 26 feet high is blown out of the supporting vertical conduit when the pressure differential is 29 p. s. i. g. It is evident that exceedingly long packed columns would be required for high pressure differentials. Also, even with low pressure differentials there is some leakage of gas from the high pressure end of the column to the low pressure end of the column. In other words, the particles are not a complete stopper or plug. This leakage of gases cannot be tolerated in certain operations.

This invention has for its object to provide apparatus whereby the foregoing difficulties can be overcome.

Another object is to provide apparatus for transfer of solid particles from a low pressure system into a high pressure system without substantial leakage of gas between the systems.

A further object is to provide apparatus for introducing solid particles into a high pressure system and removing solid particles from the high pressure system without substantial leakage of gas during such transfer.

Other objects will appear hereinafter.

These and other objects are accomplished by my invention which includes a substantially vertical conduit communicating at its lower end with a high pressure chamber, means for controlled discharge of solid particles from the lower end of the vertical conduit, means for introducing discharged solid particles into the high pressure chamber, a closed hopper for solid particles connected to the upper end of the vertical conduit, means for pressurizing the hopper to a high pressure, a vent for gases positioned intermediate the ends of the vertical conduit, and means for preventing flow of a substantial amount of solid particles through said vent. My invention also includes the combination of the foregoing with other vertical columns to form complete introduction or circulating arrangement within a system of differing pressures as will become apparent from the following description.

In the following examples and description I have set forth several of the preferred embodiments of my invention but it is to be understood that they are given by way of illustration and not in limitation thereof.

In the accompanying drawings Figures 1 to 5 illustrate the basic principles of my invention whereas Figure 6 illustrates the specific embodiment claimed in the present application. My cofiled application Serial No. 236,537 claims apparatus embodying the basic principles as well as certain specific modifications not claimed herein. Reference is also made to my co-filed application Serial No. 236,538 which discloses a specific modification of the subject matter described in application Serial No. 236,537. Referring to the drawings:

Figure 1 is a diagrammatic elevation in section of apparatus for removing solid particles from a higher pressure system to a lower pressure system in accordance with the basic principles of my invention;

Figure 2 is an enlarged diagrammatic vertical section showing details of the filtering means utilized in Figure 1;

Figures 3 and 4 are enlarged diagrammatic elevations in section of alternative apparatus for controlled removal of solid particles from the base of the vertical column of solids;

Figure 5 is a graph illustrating the manner in which the gas pressure and the solids pressure varies throughout the length of the vertical compact column of solids and;

Figure 6 is a diagrammatic elevation, partly in section, of suitable apparatus for carrying out a high pressure operation in which solids are continuously introduced into and removed from a high pressure chamber in which the operation is carried out.

The principles of my invention will be readily understood by referring to Figure 1. In this figure numeral 10 indicates a high pressure chamber in which an operation utilizing solid particles in fluidized form is carried out. For convenience, a hydrocracking or destructive hydrogenation operation will be described. This operation would be conducted in this reactor by introducing hydrogen and vapors of a hydrocarbon to be hydrocracked through conduit 12 and under high pressure. The hydrogen and vapors maintain the solid particles in reactor 10, which in this instance would be a hydrogenating catalyst, in a fluidized condition. The hydrogen and the hydrocarbon products are separated from the solid particles in cyclone separator 14 and flow out of the system through conduit 16. Solid particles in a fluidized condition, i. e., suspended in the hydrogen, settle into the top of vertical conduit 18 by gravitational force. The upper part of column 18 serves as a scrubbing section, the hydrocarbons and the hydrogen associated with the solid particles being removed by a scavenging gas such as high pressure steam introduced through conduit 20. The passage of gas through conduit 20 is at a rate such that the solid particles slowly settle through the upflowing current of gas and finally become lodged in the portion of the conduit 18 below conduit 20. The solids in this column settle into a vertical compact column which is supported by a cup-shaped member 22 positioned at the base of the column and within hopper 28 which is at a substantially lower pressure; i. e., in the case under consideration about atmospheric. A certain amount of scavenging gas will pass through the interstices between the particles in the upper part of column 18. Due to the resistance to flow of gas through the compact column the pressure of the gas will progressively decrease during such passage. These gases are vented at relatively low pressure through vent 24 which is provided with means for preventing flow of solid particles from the column 18 through the vent. The pressure of the gas and/or solid particles at the base of the column is therefore relatively low and the accumulation of a small pile of catalyst in cup 22 prevents the uncontrolled flow of catalyst particles from the column.

Catalyst particles contained in cup 22 are continuously or intermittently blown therefrom by gas passing through nozzle 26. Upon such removal the solid particles in column 18 flow downwardly to replace those which have been removed. If these are permitted to accumulate a small pile of catalyst again forms around the base and will prevent further flow until removed by the action of nozzle 26. This removed catalyst is conveyed by the current of gas into hopper 28 and thence into the conduit 30 where it is picked up and transported to any desired location by low pressure transport gas passed through conduit 30.

Referring to Figure 2, numeral 18 designates the vertical conduit of Figure 1 containing the compact solid particle column. Numeral 32 designates a plurality of conduits connected to conduit 18 the ends of which are covered with wire cloth filters 34. These wire cloth filters are held in place by pipe nipples 36 and pipe couplings 38. The ends of couplings 38 connect to reducers 40 and conduits 42 which may be connected to any suitable gas disposal or recovery system. The wire cloth filters should have a sufficiently fine mesh to prevent substantial flow of the solid particles therethrough. This filter effectively vents the gas passing downwardly through the upper portion of the compact column in 18 and at the same time prevents substantial passage of solid particles through the vent. The screen or means for preventing passage of solid particles is important since the rate of flow of gas at this point will in most cases be sufficient to transport the solid particles and cause a blowout through the compact column and the vent unless such filtering means or the like is provided.

Any device which will prevent substantial flow of solid particles through the vent can be used. For instance, a graduated bed of pieces of solid increasing in size as the vent is approached could be used to prevent the flow of solid particles through the vent. It is not necessary, as far as the operation of the vertical compact column is concerned, to prevent all of the solid particles from passing into the vent. A small amount of particles passing through the vent will not upset the sealing action of the compact column. However, such passage may be undesirable for other reasons, such as abrasion of apparatus beyond the vent, or loss of solid particles and for such reasons I prefer to keep passage through the vent as low as possible and usually at about a zero value.

If the vent between the upper and lower parts of the conduit 18 were not used the high pressure gas contained in the chamber 10 would pass downwardly through the compact column and if there was a material pressure differential between the top and bottom of the column this passage of gas would be at a sufficient rate to transport catalyst at the bottom of the column. This would result in a blowout of the entire column and nullify the purpose of the column. Of course this could be avoided by utilizing an exceedingly long column. However, as indicated above, impractically high columns would be required for material pressure differentials. When utilizing the principles of my invention a compact column 6 feet high is adequate to operate with a pressure differential of 100 pounds. A column 27 feet high is entirely adequate for a pressure differential of 900 pounds. Without the vent a column approximately 200 feet high would be required for a pressure differential of 100 p. s. i. g.

Figures 3 and 4 illustrate other methods for controlled removal of solid particles from the base of the column. Referring to Figure 3, numeral 42 designates a cup-like container or support at the base of the column 18, which container is positioned in closed receptacle 44. Receptacle 44 is connected to transport conduit 46 at its lower extremity. Cup 42 is supported by a shaft 48 which can be moved upwardly or downwardly by means of screw 50. Movement of the cup up or down adjusts the rate of flow of catalyst or solid particles from the base of the column 18. The pile of solid particles builds up in cup 42 and overflows the upper edge thereof. If the cup is raised the pile of catalyst will rise above the lower edge of vertical conduit 18 and plug up the lower end of the column and thus prevent further flow of catalyst or solid particles. If the cup 42 is lowered the solid particles will at some point begin to overflow the edge of the cup and the lower the cup is positioned the greater the rate of flow. The removed solid particles flow into conduit 46 where they are picked up by transport gas introduced through conduit 52.

Referring to Figure 4, numeral 54 indicates a cup-like member positioned below vertical conduit 18 in which a pile of solids is permitted to accumulate under the end of the column 18. Numeral 56 designates a conduit connected to the lower part of cup 54 and provided with a slide valve 58. Numeral 60 designates a conduit for removal of solid particles by means of transport gas introduced through conduit 62. The rate of flow of the catalyst from cup 54 is determined by the setting of slide valve 58. If the slide valve is closed the solid particle pile will build up in cup 54 and plug the end of the column and prevent further flow. Opening the slide valve permits catalyst to flow from around the base of the column which initiates flow of solids from the column.

Mechanical removal means may be used instead of the devices illustrated in Figures 3 and 4. For instance, an endless conveyor belt run at controlled speed under the end of the column may be used to obtain controlled removal of the solid particles. Similarly a screw conveyor for the solid particle removal could be used.

Figure 5 illustrates the manner in which the pressure of the gas and the pressure of the solid particles (the vertical pressure) varies down the length of a column when the pressure differential is approximately 900 pounds and the height of the column is roughly 23 feet, with the vent at the mid point. It will be noted that the gas pressure (solid line) falls to practically zero at the vent and that there is substantially no gas pressure between the vent and the lower end of the column. On the other hand, the pressure of the solids as determined at any point in the column (shown by the dotted line) reaches a maximum in the neighborhood of and both below and above the vent. This pressure is dissipated against the walls of the column. The pressure at the base of the column is negligible due to the absence of solids pressure as well as gas pressure at the base of the column. Therefore very little support for the column of solid particles, other than that due to the weight of the solids, is required and the removal of the catalyst under these conditions is a relatively simple matter.

It is preferable to employ a vent at approximately the mid point of the column. However, the position of the vent can be varied considerably as long as sufficient column length of compact solid particles is provided below and above the vent to dissipate the gas and solid pressure so that it will not upset the lower part of the column. A plurality of vents may be employed and these may be spaced at intervals up and down the column if desired. The filter for preventing flow of solid particles through the vent must permit adequate flow of gas. The gas flowing through the forepart of the column preferably should be permitted to escape freely through the vent rather than to be largely compelled to flow through the afterpart of the column. Any solid particle removing means may be used.

It is advantageous, although not necessary, to have the solid particles in fluidized condition when they are fed into the column and prior to the time when they form the compact column. This results in even distribution of the solid particles in the column and avoids possibility of formation of cakes or gobs of particles which might bridge across the column and result in uneven feeding through the column. The size of the particles can vary to a considerable extent. Also the particles need not be uniform in size. In general a mesh size of between about 50 and 400 mesh can be utilized. The larger meshes will require longer vertical columns.

The diameter of the column is of course determined by the volume of solid particles that must pass through it. The compact column will under most conditions move at least 50,000 lb./hr./sq. ft. of fluid type catalyst. The catalyst flow rate does not appreciably affect the gas flow through the column. In general the length of the column will depend upon how much gas can be permitted to flow through the vent and the location of the vent. If a large amount of gas passing through the vent can be tolerated a large vent and a shorter column can be used. On the other hand, a longer column would be necessary if minimum vent gas is desired. The location of the vent about at the mid point gives optimum results. However, it can be located off center to any desired extent but in such case the column must be of sufficient length between the high pressure and the vent to appreciably lower the pressure by the resistance offered by the solid particles to the flow of gas between the high pressure end and the vent and between the vent and the low pressure end. The vent must be far enough from the low pressure end of the column to prevent gas flowing from that end at a sufficiently high velocity to blow out the catalyst acting as a plug or seal.

Specifically, the length of the pressure seal leg is determined by the allowable amount of total gas leakage, that is, the longer the leg the less the total gas leakage. This total gas leakage is the sum of:

(1) Leakage through the vents (the great majority of the gas leakage occurs at this point), and
(2) The leakage from the bottom of the column.

Once the total gas leakage is decided upon, the minimum operable length of the column may be determined by the following formula:

$$L = 0.0235 \frac{P_i^2 - P_o^2}{G}$$

where
$L = \frac{1}{2}$ column length in feet
$P_i$ = inlet pressure—p. s. i. a.
$P_o$ = outlet pressure—p. s. i. a.
$G$ = total gas leakage based on cross-sectional area of the column—lb./hr./sq. ft.

At this point in the calculations the length of the column and the total gas leakage have been determined. However nothing is known concerning the distribution of the gas leakage, i. e., what part of the gas goes through the vents and what part leaves the bottom of the column. The gas leakage through the vent or vents is a function of:

(1) The cross-sectional area of the vents and
(2) The depth of the catalyst on the vent retaining screens. These two variables are related by the following formula:

$$\frac{A_b}{L_b} = \frac{A_a}{L}(0.647 G - 1)$$

where
$A_a$ = area of the column in sq. ft.
$A_b$ = vent area in sq. ft.
$L_b$ = thickness of layer of solids on the vent retaining screens in ft.

The other symbols are defined as in the first formula above.

The above equations will serve as general guides, but it is to be noted that they are determined for a case involving an inert gas, a solid particle of 250 mesh and atmospheric temperature. Suitable adjustments for other materials and conditions must be made.

I wish to emphasize that a column designed by the above formulas would be in the direction of the minimum length which should be used and that greater lengths would reduce the total amount of gas leakage. Therefore in the final analysis while the above formulas would be used as a guide in determining the length of the column and the vent requirements the final sizing of the column would be determined by economic considerations, for example, it might be found desirable to make the column somewhat longer than the length given by the formula and reduce the gas leakage, etc.

As previously indicated, my invention includes a system for introducing and a complete system for introduction and removal of solid particles and specific embodiments thereof are illustrated in Fig. 6 to which reference is made.

The apparatus illustrated in Fig. 6 and its operation can best be described in connection with a destructive hydrogenation of a hydrocarbon at an elevated pressure in the presence of a fluidized hydrogenation catalyst of small particle size. In this operation catalyst gradually becomes inactive due to deposition of tar and coke thereon and it is desirable to remove the catalyst from the reactor, regenerate it by burning off the tar and coke at a lower pressure, such as atmospheric pressure, and return the regenerated catalyst to the high pressure reactor. Numeral 70 of Figure 6 designates a high pressure chamber in which destructive hydrogenation of a hydrocarbon oil is carried out in the presence of a fluidized catalyst. The hydrogen and hydrocarbon vapors to be destructively hydrogenated are introduced into the base of the reactor through conduit 72. The reactor is partially filled with a mass of the hydrogenation catalyst. The hydrogen and hydrocarbon vapors pass upwardly through the catalyst and cause the catalyst particles to be suspended therein as in conventional fluidized operation. The hydrogen and reaction products are separated from the catalyst particles by cyclone 74 and the hydrogen and reaction products flow from the reactor through conduit 76.

Fluidized catalyst settles by gravity into the top of vertical conduit 78 and is purged with hydrogen introduced through conduit 80. The purged catalyst then settles in vertical conduit 78 to form a compact column. This column is vented in accordance with my invention, by vent 82. Catalyst is intermittently or continuously removed from the base of vertical conduit 78 by low pressure transport gas introduced through conduit 84 at a rate controlled by valve 86.

This catalyst is gradually or slowly removed from the base of the compact column by the gas stream and transported through conduits 84 and 85 into lower pressure chamber 88 which, in the case under consideration, is a regenerator operating at about atmospheric pressure. The catalyst is regenerated therein by suitable combustion gas introduced through conduit 90. This gas maintains the catalyst in the regenerator in a fluidized condition during the regeneration. Catalyst particles are separated from the combustion gases by cyclone 92 and the combustion gases then flow from the regenerator through conduit 94.

Regenerated catalyst settles in the upper part of vertical conduit 96. As the catalyst settles it is purged with steam or inert gas introduced through conduit 98 and then settles in conduit 96 in the form of a compact column. This column is vented by combination vent and solid particle filter 100 in accordance with the principles described above. The catalyst in conduit 96 is intermittently removed from the lower end thereof by low pressure transport gas introduced through conduit 102 at a rate controlled by valve 104. This removed catalyst passes upwardly through conduit 106 into hopper 108.

Hopper 108 is provided with a conduit 110 which is provided with cyclone 111 and valve 112. Numeral 114 designates a vertical conduit connected to hopper 108 which conduit is provided with a vent 116 and valve 117. The lower part of vertical conduit 114 terminates in line 118 for introduction of high pressure transport gas at a rate controlled by valve 120. Conduit 118 communicates with high pressure reactor 70.

The manner in which catalyst is removed from high pressure chamber 70 and introduced into low pressure chamber 88 is evident from the foregoing description. Catalyst in low pressure chamber 88 is introduced into high pressure chamber 70 by opening valve 104 to transport catalyst from the base of vertical column 96 into hopper 108 until it is filled with a mass of settled or quiescent catalyst particles. During this operation valve 112 is opened to permit egress of the transport gas. When hopper 108 has been filled valve 104 is closed and the catalyst in vertical column 96 assumes a static compact column condition. Gas under high pressure then is introduced through conduit 110 into hopper 108 until the pressure therein approximates the pressure in high pressure reactor 70. Valve 112 is closed and valve 120 is opened and gas under a somewhat higher pressure than exists in reactor 70 is introduced through conduit 118 to remove catalyst from the base of vertical conduit 114 and transport it into reactor 70. Valve 117 is closed during this stage of the operation. This gas passes out of the reactor 70 through conduit 76 with the reaction products and hydrogen. It is preferably hydrogen so as to avoid contamination of the hydrogen used in reactor 70. The catalyst in hopper 108 settles in vertical column 114 at a rate corresponding to the rate of removal from the base thereof. During this operation the high pressure in hopper 108 is prevented from blowing back into regenerator 88 by the sealing effect of the compact column of catalyst in vertical conduit 96, i. e., the high pressure at the base of conduit 96 is dissipated through vent 100 as described previously.

When the transfer of catalyst from hopper 108 into reactor 70 has been substantially completed it is terminated by closing valve 120 and opening valve 112 to the atmosphere or to a pressure approximating the pressure in regenerator 88 after opening valve 117 connected to vent 116. Valve 104 then is opened again to transport catalyst from vertical column 96 into hopper 108 as previously described. It it to be noted that emptying of hopper 108 should be terminated while vertical conduit 114 is still filled with a compact column of catalyst so that it will prevent backflow of gas from reactor 70 into hopper 108 when hopper 108 is at low pressure and being filled.

The operation of the apparatus illustrated in Figure 6 is necessarily intermittent. However it is possible to obtain approximately or completely continuous operation by utilizing a plurality of hoppers instead of a single hopper and emptying one of the hoppers into reactor 70 while other hopper or hoppers are being filled from regenerator 88 or being pressured up etc. The utilization of a pair of hoppers alternately in this manner is described in my above-mentioned application. Three hoppers would allow the most desirable time cycle. Each additional hopper would require an additional feed column similar to column 96 and of course an additional introduction column similar to column 114.

It will be noted that the base of vertical conduits 78, 96 and 114 do not necessitate any particular supporting means for the column of solid. While the supporting and removing means specifically described in Figures 1, 3 and 4 can be used at the base of these columns it has been found that an ordinary pipe elbow or T will be sufficient to retain a pile of catalyst which will act as a support for the column above it. When transport gas is passed through this elbow or T the pile of catalyst is transported away and consequently the compact solid starts to flow into the transport gas and is thus further removed until termination of flow of the transport gas. The gas used for transport of catalyst should be one which will not interfere with the reaction in the reactor. A normally gaseous substance need not be used. A vapor is satisfactory if the temperature of the column etc. is above the boiling point.

Also it will be noted that vertical conduits 96 and 114, of Figure 6, operate on the same basic principles as vertical conduits 78, of Figure 6, and 18, Figure 1, that is, the principle of venting most of the gas at some point intermediate the ends of the vertical column rather than allowing most of the gas to flow completely through the column is the same in each case. However, conduits 96 and 114, Figure 6, involve the additional discovery that the low pressure end of the column (upper end) need not be immersed in a bed of rigidly supported catalyst to avoid upward catalyst flow provided that the gravity effect of the body of catalyst above the vent is sufficient to offset the static gas pressure existing at the vent. This static gas pressure is determined by the pressure drop through the vent.

Bleed gas from the vents of the vertical columns can be collected and reused. For instance, if the bleed gas from the column connected to the reactor contains hydrogen it can be collected and reused by pumping back into the high pressure reactor. The specific construction illustrated in Figure 2 would permit this, i. e., conduits 42 could be connected to a suitable storage system from which the vented gas could be withdrawn for reuse.

It will be apparent that my invention has wider application than in the specific operations described. For instance it is of value in connection with fluidized catalytic cracking of petroleum products, fluidized hydroforming of petroleum products and the synthesis of hydrocarbons from carbon monoxide and hydrogen using a fluidized catalyst. Destructive hydrogenation of powdered coal or hydrodesulfurization of powdered coal may also be carried out utilizing my invention to introduce the coal powder and remove the ash or residue. My invention is also applicable to noncatalytic operations such as the coking of coal and the adsorption of gases or vapors on a solid adsorbent at elevated pressure followed by desorption at lower pressure.

What I claim is:

1. Apparatus for introducing solid particles from a lower pressure zone into a high pressure chamber without substantial flow of gas from the high pressure chamber into the lower pressure zone which comprises in combination a substantially vertical conduit adapted to retain solid particles in a compact column and communicating at its lower end with a high pressure chamber, a continuous compact column of solid particles in the vertical conduit, said particles being of a size suitable for fluidization, means for controlled discharge of solid particles from the lower end of the vertical conduit into the high pressure chamber, a closed hopper for solid particles connected to the upper end of the vertical conduit, means for pressurizing the hopper to a high pressure, a vent for gases positioned intermediate the ends of the vertical conduit, and means for preventing flow of a substantial amount of solid particles through said vent.

2. Apparatus for introducing solid particles from a lower pressure zone into a high pressure chamber without substantial flow of gas from the high pressure chamber into the lower pressure zone which comprises in combination a substantially vertical conduit adapted to retain solid particles in a compact column and communicating at its lower end with a high pressure chamber, a continuous compact column of solid particles in the vertical conduit, said particles having a size between about 100 and 400 mesh, means for controlled discharge of solid particles from the lower end of the vertical conduit, means for introducing discharged solid particles into the high pressure chamber, a closed hopper for solid particles connected to the upper end of the vertical conduit, means for introducing solid particles into the hopper, means for pressurizing the hopper to a high pressure, a vent for gases positioned intermediate the ends of the vertical conduit, means for preventing flow of a substantial amount of solid particles through said vent and a valve for controlling the flow of gas through the vent.

3. Apparatus for introducing solid particles from a lower pressure zone into a high pressure chamber without substantial flow of gas from the high pressure chamber into the lower pressure zone which comprises in combination a substantially vertical conduit adapted to retain solid particles in a compact column and communicating at its lower end with a high pressure chamber, a continuous compact column of solid particles in the vertical conduit, said particles having a size between about 100 and 400 mesh, means for controlled discharge of solid particles from the lower end of the vertical conduit, means for introducing discharged solid particles into the high pressure chamber, a closed hopper for solid particles connected to the upper end of the vertical conduit, means for introducing solid particles into the hopper, means for pressurizing the hopper to a high pressure, a vent for gases connected to the vertical conduit and positioned so that the weight of solid particles which are in the vertical conduit above the vent is sufficient to offset the static gas pressure at the vent, and means for preventing flow of a substantial amount of solid particles through said vent.

4. Apparatus for introducing solid particles from a lower pressure zone into a high pressure chamber without substantial flow of gas from the high pressure chamber into the lower pressure zone which comprises in combination a first substantially vertical conduit adapted to retain solid particles in a compact column and communicating at its lower end with a high pressure chamber, means for controlled discharge of solid particles from the lower end of the first vertical conduit into the high pressure chamber, a closed hopper for solid particles connected to the upper end of the first vertical conduit, means for pressurizing the hopper to a high pressure, a vent for gases positioned intermediate the ends of the first vertical conduit, means for preventing flow of a substantial amount of solid particles through said vent, a valve for controlling the flow of gas through the vent, a second substantially vertical conduit adapted to retain solid particles in a compact column and communicating at its upper end with the lower pressure zone and at its lower end with the hopper, means for introducing solid particles into the upper end of the second vertical conduit, means for controlled discharge of solid particles from the lower end of the second vertical conduit, means for introducing solid particles discharged from the lower end of the second vertical conduit into the hopper, a vent for gases positioned intermediate the ends of the second vertical conduit and means for preventing flow of a substantial amount of solid particles through said vent.

5. Apparatus for introducing solid particles from a lower pressure zone into a high pressure chamber without substantial flow of gas from the high pressure chamber into the lower pressure zone which comprises in combination a first substantially vertical conduit adapted to retain solid particles in a compact column and communicating at its lower end with a high pressure chamber, means for controlled discharge of solid particles from the lower end of the first vertical conduit, means for introducing discharged solid particles into the high pressure chamber, a closed hopper for solid particles connected to the upper end of the first vertical conduit, means for pressurizing the hopper to a high pressure, a vent for gases connected to the first vertical conduit and positioned so that the weight of solid particles, which during operation are in the vertical conduit above the vent, is sufficient to offset the static gas pressure at the vent, means for preventing flow of a substantial amount of solid particles through said vent, a valve for controlling flow of gas through the vent, a second substantially vertical conduit adapted to retain solid particles in a compact column and communicating at its upper end with a source of solid particles at a low pressure and at its lower end with the hopper, means for introducing solid particles into the upper end of the second vertical conduit, means for controlled discharge of solid particles from the lower end of the second vertical conduit, means for introducing solid particles discharged from the lower end of the second vertical conduit into the hopper, a vent for gases connected to the second vertical conduit and positioned so that the weight of solid particles, which during operation are in the vertical conduit above the vent, is sufficient to offset the static gas pressure at the vent, and means for preventing flow of a substantial amount of solid particles through said vent.

6. Apparatus for introducing solid particles from a lower pressure zone into a high pressure chamber and for removing solid particles from the high pressure chamber without substantial flow of gas from the high pressure chamber into the lower pressure zone which comprises in combination a first substantially vertical conduit adapted to retain solid particles in a compact column and communicating at its lower end with a high pressure chamber, means for controlled discharge of solid particles from the lower end of the first vertical conduit, means for introducing discharged solid particles into the high pressure chamber, a closed hopper for solid particles connected to the upper end of the first vertical conduit, means for pressurizing the hopper to a high pressure, a vent for gases positioned intermediate the ends of the first vertical conduit, means for preventing flow of a substantial amount of solid particles through said vent, a valve for controlling flow of gas through the vent, a second substantially vertical conduit adapted to retain solid particles in a compact column and communicating at its upper end with a source of solid particles at a low pressure and at its lower end with the hopper, means for introducing solid particles into the upper end of the second vertical conduit, means for controlled discharge of solid particles from the lower end of the second vertical conduit, means for introducing solid particles discharged from the lower end of the second vertical conduit into the hopper, a vent for gases positioned intermediate the ends of the second vertical conduit, means for preventing flow of a substantial amount of solid particles through said vent, a third substantially vertical conduit adapted to retain solid particles in a compact column the upper end of which communicates with the high pressure chamber and the lower end of which communicates with the low pressure zone, means for introducing solid particles contained, during operation in the high pressure chamber, into the top of the third vertical conduit, means for controlled discharge of solid particles from the lower end of the third vertical conduit, a vent for gases positioned intermediate the ends of the third vertical conduit, and means for preventing flow of a substantial amount of solid particles through said vent.

7. Apparatus for introducing solid particles from a lower pressure zone into a high pressure chamber and for removing solid particles from the high pressure chamber without substantial flow of gas from the high pressure chamber into the lower pressure zone which comprises in combination a first substantially vertical conduit adapted to retain solid particles in a compact column and communicating at its lower end with a high pressure chamber, means for controlled discharge of solid particles from the lower end of the first vertical conduit, means for introducing discharged solid particles into the high pressure chamber, a closed hopper for solid particles connected to the upper end of the first vertical conduit, means for pressurizing the hopper to a high pressure, a vent for gases connected to the first vertical conduit and positioned so that the weight of solid particles, which during operation are in the vertical conduit above the vent, is sufficient to offset the static gas pressure at the vent, means for preventing flow of a substantial amount of solid particles through said vent, a valve for controlling the flow of gas through the vent, a second substantially vertical conduit adapted to retain solid particles in a compact column and communicating at its upper end with a source of solid particles and with the low pressure zone and at its lower end with the hopper, means for introducing solid particles into the upper end of the second vertical conduit, means for controlled discharge of solid particles from the lower end of the second vertical conduit, means for introducing solid particles discharged from the lower end of the second vertical conduit into the hopper, a vent for gases connected to the second vertical conduit and positioned so that the weight of solid particles, which during operation are in the vertical conduit above the vent, is sufficient to offset the static gas pressure at the vent, means for preventing flow of a substantial amount of solid particles through said vent, a third substantially vertical conduit adapted to retain solid particles in a compact column the upper end of which communicates with the high pressure chamber and the lower end of which communicates with a low pressure zone, means for introducing solid particles contained, during operation in the high pressure chamber into the top of the third vertical conduit, means for controlled discharge of solid particles from the lower end of the third vertical conduit, a vent for gases positioned in the central portion of the third vertical conduit, and means for preventing flow of a substantial amount of solid particles through said vent.

8. Apparatus for circulating solid particles from a lower pressure chamber into a high pressure chamber and back to the lower pressure chamber without substantial flow of gas from the high pressure chamber into the lower pressure chamber which comprises in combination a first substantially vertical conduit adapted to retain solid particles in a compact column and communicating at its lower end with a high pressure chamber, means for controlled discharge of solid particles from the lower end of the first vertical conduit, means for introducing discharged solid particles into the high pressure chamber, a closed hopper for solid particles connected to the upper end of the first vertical conduit, means for pressurizing the hopper to a high pressure, a vent for gases positioned intermediate the ends of the first vertical conduit, means for preventing flow of a substantial amount of solid particles through said vent, a valve for controlling the flow of gas through the vent, a second substantially vertical conduit adapted to retain solid particles in a compact column and communicating at its upper end with a lower pressure chamber and at its lower end with the hopper, means for introducing solid particles, contained in the lower pressure chamber during operation, into the upper end of the second vertical conduit, means for controlled discharge of solid particles from the lower end of the second vertical conduit, means for introducing solid particles discharged from the lower end of the second vertical conduit into the hopper, a vent for gases positioned intermediate the ends of the second vertical conduit, means for preventing flow of a substantial amount of solid particles through said vent, a third substantially vertical conduit adapted to retain solid particles in a compact column the upper end of which communicates with the high pressure chamber and the lower end of which communicates with the lower pressure chamber, means for introducing solid particles contained in the high pressure chamber into the top of the third vertical conduit, means for controlled discharge of solid particles from the lower end of the third vertical conduit, means for conveying discharged particles into the lower pressure chamber, a vent for gases positioned intermediate the ends of the third vertical conduit, and means for preventing flow of a substantial amount of solid particles through said vent.

9. Apparatus for circulating solid particles of catalyst from a lower pressure regenerator into a high pressure reactor and back to the regenerator without substantial flow of gas from the high pressure reactor into the lower pressure regenerator which comprises in combination a first substantially vertical conduit adapted to retain solid particles in a compact column and communicating at its lower end with a high pressure reactor, means for controlled discharge of solid particles from the lower end of the first vertical conduit, means for introducing discharged solid particles into the high pressure reactor, a closed hopper for solid particles connected to the upper end of the first vertical conduit, means for pressurizing the hopper to a high pressure, a vent for gases positioned intermediate the ends of the first vertical conduit, means for preventing flow of a substantial amount of solid particles through said vent, a valve for controlling flow of gas through the vent, a second substantially vertical conduit adapted to retain solid particles in a compact column and communicating at its upper end with the regenerator and at its lower end with the hopper, means for introducing solid particles contained during operation in the regenerator into the upper end of the second vertical conduit, means for controlled discharge of solid particles from the lower end of the second vertical conduit, means for introducing solid particles discharged from the lower end of the second vertical conduit into the hopper, a vent for gases positioned intermediate the ends of the second vertical conduit, means for preventing flow of a substantial amount of solid particles through said vent, a third substantially vertical conduit adapted to retain solid particles in a compact column the upper end of which communicates with the high pressure reactor and the lower end of which communicates with the low pressure regenerator, means for introducing solid particles contained during operation in the high pressure reactor into the top of the third vertical conduit, means for controlled discharge of solid particles from the lower end of the third vertical conduit, means for conveying discharged particles into the regenerator, a vent for gases positioned intermediate the ends of the third vertical conduit, and means for preventing flow of a substantial amount of solid particles through said vent.

10. A process for introducing solid particles of a size suitable for fluidization into a closed chamber which is under elevated pressure from a lower pressure reservoir which comprises forming said solid particles into an approximately vertical continuous compact column the upper end of which is exposed to the lower pressure reservoir and the other end of which communicates with the closed chamber at elevated pressure, removing gas substantially free of solid particles, which gas leaks from the high pressure chamber through the compact column, at a point intermediate the ends of the column, filling the low pressure reservoir with solid particles to be introduced, pressurizing the reservoir, preventing further leakage of gas, intermediate the ends of the column, removing solid particles from the lower end of the column and conveying them into the closed chamber.

11. The process for removing solid particles from a high pressure chamber to a lower pressure treating chamber and for returning the solid particles to the high pressure chamber which comprises forming solid particles contained in the high pressure chamber into a first compact column one end of which is exposed to the elevated pressure in the high pressure chamber and the other end of which is exposed to a lower pressure substantially the same as the pressure in the treating chamber, removing gas substantially free of solid particles, which gas leaks from the high pressure chamber through the first compact column, said removal taking place at a point intermediate the ends of the first compact column, adding solid particles to the first compact column at the high pressure end thereof, removing solid particles at a controlled rate from the low pressure end of the first compact column, transporting the removed solid particles to the treating chamber, subjecting the removed catalyst particles to a treatment at the lower pressure existing in the treating chamber, forming the treated solid particles into a second compact column, introducing treated solid particles into the upper end of the second compact column, removing solid particles from the lower end of the second compact column, conveying solid particles removed from the lower end of the second compact column into a hopper which communicates with the base of the second compact column, forming the solid particles contained in the hopper into a third compact column, introducing particles contained in the hopper into the top of the third compact column, pressurizing the hopper, venting gas passing from the hopper into the base of the second compact column from the midportion of the second compact column, removing solid particles from the base of the third compact column by means of high pressure transport gas, simultaneously introducing solid particles into the top of the third compact column from the hopper, introducing the high pressure gas and the solid particles removed from the base of the third compact column into the high pressure chamber, terminating the removal of solid particles from the base of the third compact column, and venting gas passing from the high pressure chamber into the base of the third compact column, such venting taking place at a point intermediate the ends of the third compact column.

References Cited in the file of this patent

UNITED STATES PATENTS

| | | |
|---|---|---|
| 494,274 | Kelly | Mar. 28, 1893 |
| 1,498,630 | Jensen | June 24, 1924 |
| 2,338,606 | Voorhees | Jan. 4, 1944 |
| 2,448,272 | Payne et al. | Aug. 31, 1948 |
| 2,490,828 | Newton | Dec. 13, 1949 |
| 2,502,954 | Blanding | Apr. 4, 1950 |
| 2,509,983 | Morrow | May 30, 1950 |
| 2,546,625 | Bergstrom | Mar. 27, 1951 |
| 2,590,202 | Norton | Mar. 25, 1952 |
| 2,626,235 | Wilson | Jan. 20, 1953 |

FOREIGN PATENTS

| | | |
|---|---|---|
| 126,783 | Australia | Feb. 26, 1948 |